United States Patent [19]

Bauman

[11] Patent Number: 4,525,044
[45] Date of Patent: Jun. 25, 1985

[54] SOFT CONTACT LENS WITH SURFACE IDENTIFICATION AND METHOD OF USING SAME

[76] Inventor: Robert C. Bauman, 86 Goodhouse Rd., Litchfield, Conn. 06759

[21] Appl. No.: 491,891

[22] Filed: May 5, 1983

[51] Int. Cl.³ .................................................. G02C 7/04
[52] U.S. Cl. ................................ 351/160 H; 351/162; 351/177
[58] Field of Search ............... 351/160 R, 160 H, 161, 351/162

[56] References Cited

U.S. PATENT DOCUMENTS

| | | | |
|---|---|---|---|
| 3,189,914 | 6/1965 | Gusewitch et al. | 351/160 R X |
| 3,712,718 | 1/1973 | LeGrand et al. | 351/160 R |
| 4,071,293 | 1/1978 | Avery | 351/160 R |
| 4,193,671 | 3/1980 | Erickson et al. | 351/160 H |
| 4,194,814 | 3/1980 | Fischer et al. | 351/160 H X |
| 4,268,133 | 5/1981 | Fischer et al. | 351/161 |
| 4,309,085 | 1/1982 | Morrison | 351/39 |

*Primary Examiner*—John K. Corbin
*Assistant Examiner*—Scott J. Sugarman

[57] ABSTRACT

A soft contact lens of generally symmetrical concavo-convex configuration and of uniform optical power about its optic axis is provided with an elongated marking in the peripheral portion thereof to permit the user to identify readily the inner surface of the lens. This marking is asymmetrical about its midpoint so that the user can determine the appropriate surface by noting the direction of asymmetry. This marking may be produced as a raised or recessed surface during moulding and casting of the lens, or as a recessed surface subsequently by etching, engraving or the like, or it may be formed by printing of the lens.

21 Claims, 12 Drawing Figures

SOFT CONTACT LENS WITH SURFACE IDENTIFICATION AND METHOD OF USING SAME

BACKGROUND OF THE INVENTION

The present invention relates to contact lenses of the type presently referred to as soft polymeric lenses for extended wear and paritcular to means by which the surface to be disposed against the eye may be readily determined by the user.

With the development of newer polymers for soft contact lenses, the thickness of the lenses has been steadily reduced to the point where it is quite difficult for users with impaired eyesight to readily determine that surface which should be disposed against the eye. The curves on both surfaces appear to be equivalent and the edges are of such narrow width that the angular orientation is not readily discernable. If the extended wear lenses are inserted reversely, the lens will adapt to the eye but will not provide the desired correction in some instances, and it will not move smoothly upon the eye so that the user will begin to feel discomfort and some irritation will develop.

It is an object of the present invention to provide an improved soft contact lens of the extended wear type which will permit the user to readily determine the eye contacting surface by means of indicia provided thereon.

It is also the object to provide such a contact lens wherein the indicia are located in an area which will not interfere with the wearer's vision, and where the indicia may be of sufficient size so as to be interpretable by most users without the necessity for magnification to augment their vision.

Another object is to provide such contact lenses which may be fabricated in a facile and economical manner.

SUMMARY OF THE INVENTION

It has now been found that the foregoing and related objects and advantages may be readily attained in a soft contact lens of generally symmetrical concavo-convex configuration and uniform power about the optic axis. The lens has an inner surface for placement against the eye and an outer surface, which have a peripheral portion adjacent to circumference thereof. At least one of these surfaces has in its peripheral portion a circumferentially elongated directional marking thereon which is asymmetrical about its midpoint. As a result, the wearer may determine the orientation of the asymmetrical directional marking and identify readily the inner surface of the lens for placement against the eye.

In its preferred form, the marking is on the outer surface of the lens, and it may be formed either during the molding or casting of the lens or by etching or printing of the lens after it has been formed. The marking will normally include an elongated curvilinear indicium, and it may have a distinctive indicium at one end of the curvilinear indicium or a distinctive indicium spaced from one end thereof.

Alternatively, the marking may comprise a multiplicity of separate indicia spaced along an arc, and these indicia may be irregular in spacing or may be of two distinctive types in order to facilitate determination of the proper surface for placement against the eye.

DETAILED DESCRIPTION OF THE ILLUSTRATED EMBODIMENTS

Figure 1:
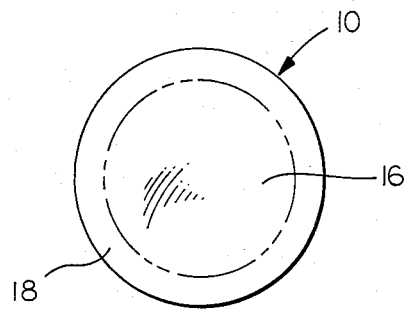
FIG. 1 is a plan view of a contact lens of the type with which the present invention in employed.
Figure 2:
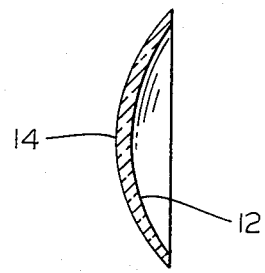
FIG. 2 is a cross-sectional view thereof.

Turning now in detail to the drawings, FIGS. 1 and 2 illustrate the type of contact lens in which the present invention is employed and generally designated by the numeral 10. This lens 10 is molded, cast or otherwise formed from a soft synthetic resin which is homogeneous throughout and the lens has a regular circular configuration with uniform optical power about its optic axis. It is dimensioned to extend beyond the cornea of the wearer, thus providing a circumferential portion 18 beyond the central corneal area 16. It is in the circumferential portion 18 which is utilized to accommodate the markings of the present invention.

In FIG. 2 the general configuration of the concavo-convex lens is illustrated, the inside surface being designated by the numeral 12 and the outside surface being designated by the numeral 14. The lenses with which the present invention employed are the typical concavo-convex lenses which are symmetrical and of uniform optic power about their center line or optic axis.

Turning now to FIGS. 3-12, therein illustrated are a series of different types of asymmetrical markings which may be used in the circumferential portion 18 to help the wearer identify the inner surface of the lens to be placed against the eye. In the illustrated embodiments, for convenience it will be assumed that the user will identify the inner surface of the lens by observing the asymmetric point of identification as being disposed to the right as the user views the lens with the inner surface disposed upwardly upon his or her finger for placement of the lens in the eye.

Figure 3:
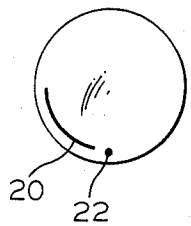
FIGS. 3-12 are front elevational views of contact lenses showing the various types of asymmetrical markings that may be employed in accordance with the present invention.
Figure 4:
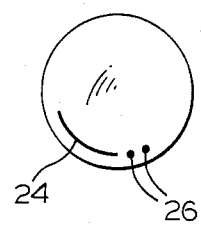
Figure 5:
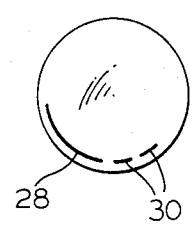
Figure 6:
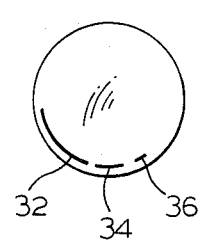

In FIG. 3, the asymmetric marking comprises the elongated arcuate line 20 and the dot 22 spaced from the right end thereof. In FIG. 4, the asymmetric marking comprises the elongated arcuate line 24 and a pair of dots 26 spaced from the right end thereof. In FIG. 5, an elongated arcuate line 28 is employed together with two short arcuate lines 30 spaced from the right end thereof. In FIG. 6, an elongated arcuate line 32 is used together with a shorter elongated arcuate line 34 and a still shorter arcuate line 36 spaced from the right end thereof.

Figure 7:
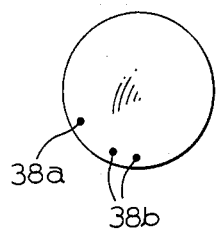
Figure 8:
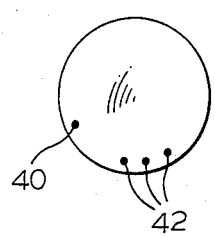

In the embodiment of FIG. 7, the asymetic marking is provided by a series of three dots 38, the left most one of which 38a is spaced a substantially greater distance from the intermediate dot 38b relative to the spacing between the two right hand dots 38b. In the embodiment of FIG. 8, a series of four dots are utilized with the left most dot 40 being spaced substantially further from the remaining three dots than the spacing between the other three dots 42.

Figure 9:
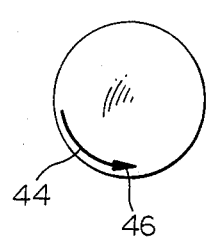
Figure 10:
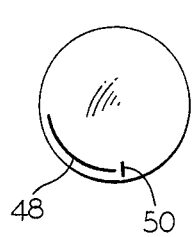
Figure 11:
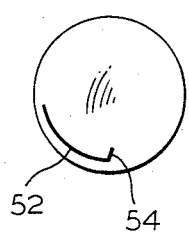

In FIG. 9, the marking comprises an elongated arcaute line 44 with an arrowhead 46 at the right end thereof. In FIG. 10, the marking comprises an elongated arcuate line 48 with a relatively short radial line 50 at the right end thereof. In FIG. 11, the marking comprises the relatively long arcuate line 52 with a short radial line or hook 54 at the right end thereof.

Figure 12:
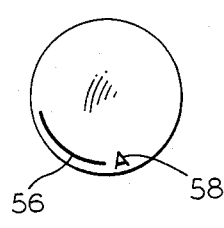

In FIG. 12, the asymmetric marking comprises the elongated arcuate line 56 and the character A designated by the numeral 58 spaced from the right end thereof.

In each of the illustrated embodiments, the marking is of sufficient size and of an asymmetric configuration which is readily interpretable by the wearer without the need for magnification.

Because the lenses are transparent, the markings of the present invention may be provided on either of the surfaces. To ensure against any tendency to product discomfort, the preferred surface is the outer surface of the lens when applied to the eye.

The markings may be formed during molding or casting by suitable complimentary surfaces on the mold surfaces, or they may be formed subsequently by etching or engraving. Such etching or engraving may be by mechanical or by chemical means, or may be effected by use of laser etching techniques.

As will be readily appreciated, a marking involving a recess produced by the molding or etching process can be filled with a compatible resinous material for increased visibility. However, this can present some cosmetic problems since the lens tends to float about upon the cornea and a distinctive coloration might be observable by other persons.

Moreover, in addition to the above techniques, a solvent dye solution may be used to imprint the markings upon the surface of the lens. In such an instance, the coloration and size of the dye markings should be selected to minimize the likelihood that it will present a cosmetic blemish when viewed by another person.

Moreover, although the molding or other marking generation technique may generate the markings in raised character form, the preferred markings are those which are formed as recesses, and these recesses should be shallow to avoid excessive reduction in the strength of the lens thereabout.

As would be readily appreciated, the contact lenses with which the present invention is employed are of the soft type which utilize those synthetic polymers which readily absorb water (i.e., hydrophilic polymers) and which readily float upon the surface of the eye. By providing the characters or markings as a recess or as a solvent printed marking, there is no tendency for the markings to abrade the eye if disposed thereagainst or to abrade the eyelid.

In using the lenses of the present invention, the lenses are rinsed in the usual manner, and the inspection of the marking is performed to determine which surface of the lens is that to be disposed upwardly upon the users finger for placement against the eye. Because the light transmission characteristics through even the uncolored markings will differ from those through the unmodified lens material, the user may readily determine from the asymmetry of the marking which surface is that to be placed upwardly upon the finger for placement against the eye.

When the lens is placed upon the eye, the saline solution which is utilized for rinsing the lens and the normal lachrymal secretions will fill the recess as of recessed markings so that there is essentially no discernable difference from a distance, thus providing minimal likelihood of cosmetic blemish.

Thus, it can be seen from the foregoing detailed specification and attached drawings that the present invention provides a contact lens which readily permits the user to determine the lens surface to be placed against the eye. Moreover, the technique to produce such markings may be performed simply and economically, and the markings will have minimal cosmetic effect upon the lens when worn by the user.

Having thus described the invention, I claim:

1. A soft contact lens of generally symmetrical concavo-convex configuration with uniform optical power about the optic axis and having an inner surface for placement against the eye and an outer surface, said surfaces having a peripheral portion adjacent the circumference thereof, said peripheral portion of one of said surfaces having a circumferentially elongated directional marking thereon which is asymmetrical about its midpoint to enable the user to identify readily the inner surface of the lens by the direction of asymmetry, said lens being cast or molded from a synthetic resin which is homogeneous throughout said lens and of uniform coloration, said indicia being of sufficient size and of a configuration to be interpretable by the wearer without magnification, said indicia being substantially nondiscernable when in place in the user's eye to avoid cosmetic blemish.

2. The contact lens of claim 1 wherein said marking is only on the surface of the lens intended to be disposed outwardly.

3. The contact lens of claim 1 wherein said marking is formed during the molding of said lens.

4. The contact lens of claim 1 wherein said marking is formed by etching of said lens.

5. The contact lens of claim 1 wherein said marking includes an elongated curvilinear indicium.

6. The contact lens of claim 5 wherein said marking includes a distinctive indicium at one end of said curvilinear indicium.

7. The contact lens of claim 6 wherein said distinctive indicium is spaced from said one end of said curvilinear indicium.

8. The contact lens of claim 1 wherein said marking comprises a multiplicity of separate indicia spaced along an arc.

9. The contact lens of claim 8 wherein said indicia are irregular in spacing to provide the asymmetry.

10. The contact lens of claim 8 wherein said indicia comprise at least two distincitive types of indicia to provide the asymmetry.

11. A soft contact lens of generally symmetrical concavo-convex configuration with uniform optical power about the optic axis and having an inner surface for placement against the eye of an outer surface, said surfaces each having a peripheral portion adjacent the circumference thereof, the outer of said peripheral portions having a circumferentially elongated directional marking thereon which is asymmetrical about its midpoint to enable the user to identify readily the inner surface of the lens by the direction of asymmetry, said marking being disposed along an elongated arc and comprising recesses in said lens, said lens being cast or molded from a synthetic resin which is homogenous throughout said lens and of uniform coloration, said indicia being of sufficient size and of a configuration to be interpretable by the wearer without magnification, said indicia being substantially nondiscernible when in place in the user's eye to avoid cosmetic blemish.

12. The contact lens of claim 11 wherein said marking includes an elongated curvilinear indicium.

13. The contact lens of claim 12 wherein said marking includes a distinctive indicium at one end of said curvilinear indicium.

14. The contact lens of claim 13 wherein said distinctive indicium is spaced from the end of said curvilinear indicium.

15. The contact lens of claim 11 wherein said marking comprises a multiplicity of separate indicia spaced along an arc.

16. The contact lens of claim 15 wherein said indicia are irregular in spacing to provide the asymmetry.

17. The contact of claim 15 wherein said indicia comprise at least two distinctive types of asymmetry to provide the indicia.

18. The contact lens of claim 11 wherein said recesses are formed by etching of said lens.

19. In a method for opthalmic correction using soft contact lenses, the steps comprising:

A. providing a soft contact lens of generally symmetrical concavo-convex configuration with uniform optical power about the optic axis and having an inner surface for placement against the eye and an outer surface, said surfaces having a peripheral portion adjacent the circumference thereof, said peripheral portion of one of said surfaces having a circumferentially elongated directional marking thereon which is asymmetrical about its midpoint to enable the user to identify readily the inner surface of the lens by the direction of asymmetry, said lens being cast or molded from a synthetic resin which is homogeneous throughout said lens and of uniform coloration, said indicia being of sufficient size and of a configuration to be interpretable by the wearer without magnification, said indicia being substantially nondiscernable when in place in the user's eye to avoid cosmetic blemish;

B. examining said contact lens to observe the direction of asymmetry of said marking and thereby to identify the inner surface of the said lens to be placed against the eye; and C. placing said lens in the eye with said inner surface disposed thereagainst.

20. The method in accordance with claim 19 wherein said marking is on the outer surface of the lens intended to be disposed outwardly from the eye.

21. The method in accordance with claim 19 wherein said marking comprises a multiplicity of separate indicia spaced along an arc.

* * * * *

UNITED STATES PATENT AND TRADEMARK OFFICE
CERTIFICATE OF CORRECTION

PATENT NO. : 4,525,044

DATED : June 25, 1985

INVENTOR(S) : Robert C. Bauman

It is certified that error appears in the above—identified patent and that said Letters Patent is hereby corrected as shown below:

Column 4, line 47, "distincitive" should be -- distinctive --

Column 5, line 12, after "contact" insert -- lens --

Signed and Sealed this

Fifteenth Day of October 1985

[SEAL]

Attest:

Attesting Officer

DONALD J. QUIGG

Commissioner of Patents and Trademarks—Designate